United States Patent
Park et al.

(10) Patent No.: US 11,862,800 B2
(45) Date of Patent: Jan. 2, 2024

(54) ANODE ACTIVE MATERIAL FOR LITHIUM SECONDARY BATTERY, METHOD OF FORMING THE SAME AND LITHIUM SECONDARY BATTERY INCLUDING THE SAME

(71) Applicant: SK ON CO., LTD., Seoul (KR)

(72) Inventors: Gwi Ok Park, Daejeon (KR); Seok Keun Yoo, Daejeon (KR); Ju Ho Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/692,963

(22) Filed: Mar. 11, 2022

(65) Prior Publication Data

US 2022/0293945 A1 Sep. 15, 2022

(30) Foreign Application Priority Data

Mar. 11, 2021 (KR) .................. 10-2021-0032100
Jul. 15, 2021 (KR) .................. 10-2021-0093032

(51) Int. Cl.
*H01M 4/587* (2010.01)
*H01M 10/0525* (2010.01)
(Continued)

(52) U.S. Cl.
CPC ......... *H01M 4/587* (2013.01); *H01M 4/0471* (2013.01); *H01M 4/1393* (2013.01); *H01M 4/1395* (2013.01); *H01M 4/386* (2013.01); *H01M 10/0525* (2013.01); *H01M 2004/021* (2013.01)

(58) Field of Classification Search
None
See application file for complete search history.

(56) References Cited

U.S. PATENT DOCUMENTS

2016/0204420 A1* 7/2016 Toulis .................. H01M 4/366
427/113

FOREIGN PATENT DOCUMENTS

| CN | 103633306 | * | 3/2014 | ........ H01M 10/0525 |
| CN | 106663808 | * | 5/2017 | ............. C01B 32/21 |

(Continued)

OTHER PUBLICATIONS

Kazuhisa Yano et al., Novel method to incorporate Si into monodispersed mesoporous carbon spheres, Journal of Colloid and Interface Science, 2016, p. 20-24, vol. 479, Elsevier.

(Continued)

*Primary Examiner* — Jonathan Crepeau
*Assistant Examiner* — Angela J Martin
(74) *Attorney, Agent, or Firm* — IP & T GROUP LLP

(57) ABSTRACT

An anode active material for a lithium secondary battery and a lithium secondary battery are provided. The anode active material includes a carbon-based particle including pores formed in at least one of an inside of the particle and a surface of the particle and having a pore size of the carbon-based particle is 20 nm or less, and silicon formed at an inside of the pores of the carbon-based particle or on the surface of the carbon-based particle. Silicon has an amorphous structure or a crystallite size of silicon measured by an XRD analysis is 7 nm or less. Difference between volume expansion ratios of carbon and silicon can be reduced to improve life-span property of the secondary battery.

10 Claims, 1 Drawing Sheet

(51) Int. Cl.
*H01M 4/38* (2006.01)
*H01M 4/1393* (2010.01)
*H01M 4/1395* (2010.01)
*H01M 4/02* (2006.01)
*H01M 4/04* (2006.01)

(56) References Cited

FOREIGN PATENT DOCUMENTS

| CN | 112234181 | * | 1/2021 | ........ H01M 10/0525 |
| CN | 113582182 | * | 1/2021 | ........ H01M 10/0525 |
| KR | 10-1591698 B1 | | 2/2016 | |
| KR | 10-2016-0081679 A | | 7/2016 | |
| KR | 10-2016-0089858 A | | 7/2016 | |
| KR | 10-2019-0010250 A | | 1/2019 | |
| KR | 10-2020-0019394 A | | 2/2020 | |
| KR | 10-2020-0100557 A | | 8/2020 | |
| WO | WO 2020256395 | * | 12/2020 | ............ H01M 4/386 |

OTHER PUBLICATIONS

Vinodkumar Etacheri et al., Porous carbon sphere anodes for enhanced lithium-ion storage, Journal of Materials Chemistry A, Mar. 20, 2015, The Royal Society of Chemistry.
Carlos Moreno-Castilla, Colloidal and micro-carbon spheres derived from low-temperature polymerization reactions, Advances in Colloid and Interface Science, 2016, p. 113-141, vol. 236, Elsevier.
Raoof Bardestani et al., Experimental methods in chemical engineering: specific surface area and pore size distribution measurements—BET, BJH, and DFT, The Canadian Journal of Chemical Engineering, 2019, p. 2781-2791.
Kai He et al., Method for Determining Crystal Grain Size by X-Ray Diffraction, Crystal Research & Technology, 2018, p. 1-6, vol. 53.
Extended European Search Report for the European Patent Application No. 22161654.3 issued by the European Patent Office dated Aug. 26, 2022.

* cited by examiner

ANODE ACTIVE MATERIAL FOR LITHIUM SECONDARY BATTERY, METHOD OF FORMING THE SAME AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2021-0032100 filed on Mar. 11, 2021 and No. 10-2021-0093032 filed on Jul. 15, 2021 in the Korean Intellectual Property Office (KIPO), the entire disclosure of which is incorporated by reference herein.

BACKGROUND

1. Field

The present invention relates to an anode active material for a lithium secondary battery, a method of forming the same and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

Recently, as an application range of the lithium secondary battery has been expanded, the lithium secondary battery having higher capacity and power are being developed. Particularly, silicon providing high capacity is combined with carbon to be used as an anode active material.

However, a difference of a volume expansion ratio may occur in the silicon-carbon composite anode active material to result in cracks in the anode active material and an exposure to the electrolyte during repeated charging and discharging.

Accordingly, developments of an anode active material preventing cracks therein and while maintaining capacity properties are required. For example, Korean Issued Patent Publication No. 10-1591698 discloses am anode active material containing silicon oxide, which may not provide sufficient life-span and power properties.

SUMMARY

According to an aspect of the present invention, there is provided an anode active material for a lithium secondary battery having improved power property and capacity efficiency.

According to an aspect of the present invention, there is provided a method of forming an anode material having improved power property and capacity efficiency.

According to an aspect of the present invention, there is provided a lithium secondary battery including an anode active material having improved power property and capacity efficiency.

An anode active material for a lithium secondary battery according to exemplary embodiments includes a carbon-based particle including pores formed in at least one of an inside of the particle and a surface of the particle and having a pore size of 20 nm or less, and silicon formed at an inside of the pores of the carbon-based particle or on the surface of the carbon-based particle. Silicon has an amorphous structure or a crystallite size of silicon measured by an X-ray diffraction (XRD) analysis is 7 nm or less.

In some embodiments, the crystallite size of silicon may be measured by Equation 1:

$$L = \frac{0.9\lambda}{\beta \cos\theta} \qquad \text{[Equation 1]}$$

In Equation 1, L is the crystallite size (nm), X is an X-ray wavelength (nm), $\beta$ is a full width at half maximum (rad) from a peak of a (111) plane of silicon, and $\theta$ is a diffraction angle (rad).

In some embodiments, the carbon-based particle may include activated carbon, carbon nanotube, carbon nanowire, graphene, carbon fiber, carbon black, graphite, porous carbon, pyrolyzed cryogel, pyrolyzed xerogel and/or pyrolyzed aerogel.

In some embodiments, the pore size of the carbon-based particle may be less than 10 nm.

In some embodiments, the carbon-based particle may have an amorphous structure.

In some embodiments, the anode active material may further include at least one of silicon oxide (SiOx, 0<x<2) and silicon carbide (SiC) formed at the inside of the pores of the carbon-based particle or on the surface of the carbon-based particle.

In some embodiments, a crystallite size of silicon included in silicon oxide may be 7 nm or less.

In some embodiments, the crystallite size of silicon may be 4 nm or less.

A lithium secondary battery includes an anode including an anode active material for a lithium secondary battery according to embodiments as described above, and a cathode facing the anode.

In a method of forming an anode active material for a lithium secondary battery, a carbon-based particle including pores that have a pore size of 20 nm or less is prepared. A silicon-based compound gas is injected to the carbon-based particle. The carbon-based particle is fired together with the silicon-based compound gas to deposit silicon at an inside of the pores of the carbon-based particle or on the surface of the carbon-based particle. Silicon has an amorphous structure or a crystallite size of silicon measured by an X-ray diffraction (XRD) analysis is 7 nm or less.

In some embodiments, the firing may be performed at a temperature less than 600° C.

According to exemplary embodiments of the present invention, carbon-based particles may include pores. For example, the carbon-based particle may be a porous particle including a plurality of pores. In this case, silicon may be disposed on at least one of an inside of the pores and a surface of the carbon-based particle. Accordingly, cracks due to a difference of volume expansion ratio between carbon and silicon during charging and discharging of the secondary battery may be prevented.

In exemplary embodiments, a pore size of the carbon-based particles may be 20 nm or less. In this case, silicon may be sufficiently deposited at the inside of the pores, so that the difference of volume expansion ratio between carbon and silicon may be sufficiently reduced.

In exemplary embodiments, a crystallite size of silicon measured through an XRD analysis may be 7 nm or less. In this case, high-capacity property of silicon may be sufficiently implemented while maintaining a sufficiently small crystallite size. Accordingly, enhanced life-span properties may be obtained while maintaining the capacity property.

In exemplary embodiments, a peak intensity ratio in a Raman spectroscopy of silicon may be 1.2 or less. In this case, a ratio of an amorphous structure of silicon may be increased so that a structural stability of the anode active material may be improved. Accordingly, enhanced life-span property of the secondary battery may be achieved.

DETAILED DESCRIPTION OF THE EMBODIMENTS

Figure 1:
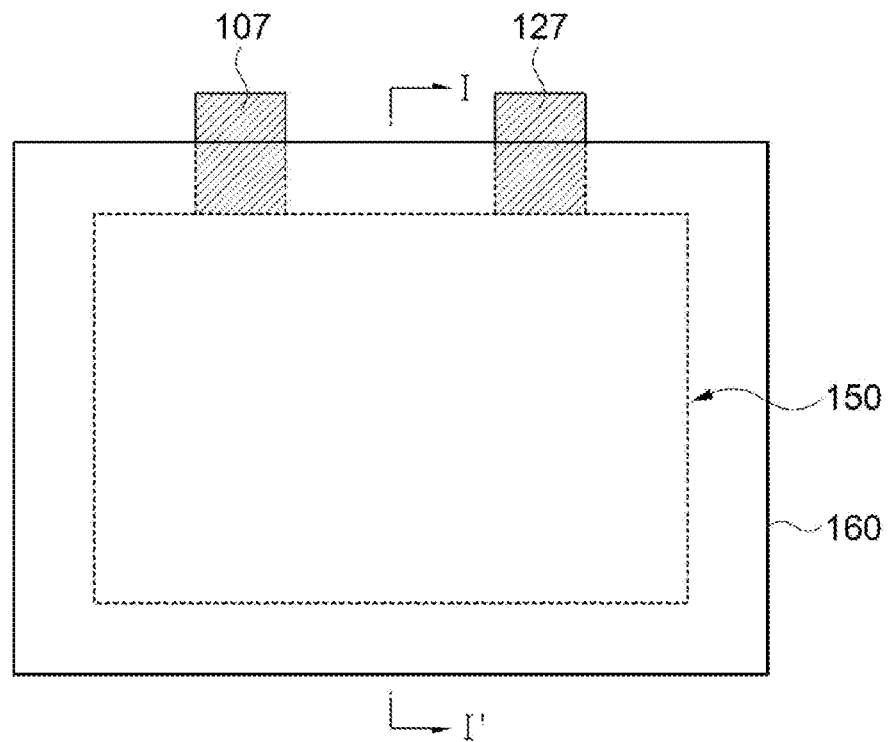
FIGS. 1 and 2 are a schematic top planar view and a schematic cross-sectional view, respectively, illustrating a lithium secondary battery in accordance with exemplary embodiments.

According to exemplary embodiments of the present invention, an anode active material for a lithium secondary battery including porous carbon-based particles and silicon is provided. According to exemplary embodiments of the present invention, a method forming the anode active material and a lithium secondary battery including the anode active material are also provided.

Hereinafter, the present invention will be described in detail with reference to exemplary embodiments and the accompanying drawings. However, those skilled in the art will appreciate that such embodiments are provided to further understand the spirit of the present invention and do not limit subject matters to be protected as disclosed in the detailed description and appended claims.

For example, an anode active material may include silicon and carbon-based particles. In this case, carbon components may partially reduce or relieve a volume expansion of silicon. However, as charging and discharging of a secondary battery may be repeated, a difference between volume expansion ratios of silicon (e.g., about 400% or more) and carbon (e.g., about 150% or less) may be increase to cause cracks in the anode active material. As a result, the anode active material may be exposed to an electrolyte, and a side reaction such as a gas generation may occur during the repeated charging and discharging to deteriorate life-span properties of the secondary battery.

According to exemplary embodiments of the present invention, the carbon-based particles may include pores in at least one of a surface and an inside of the particle. For example, the carbon-based particle may be a porous particle including a plurality of pores. In exemplary embodiments, silicon may be formed at the inside of the pores. Thus, cracks due to the difference in volume expansion ratios between carbon and silicon during the repeated charging and discharging of the secondary battery may be prevented.

In exemplary embodiments, a pore size of the carbon-based particles may be 20 nm or less, preferably less than 10 nm. If the pore size is excessively large (e.g., greater than 20 nm), the difference in volume expansion ratios of carbon and silicon during the charging and discharging of the secondary battery may not be sufficiently reduced.

In some embodiments, a minimum value of the pore size of the carbon-based particle may be 0.1 nm.

For example, the above-described carbon-based particles may include activated carbon, carbon nanotube (CNT), carbon nano-wire, graphene, carbon fiber, carbon black, graphite, porous carbon (micro/meso/macro porous carbon), pyrolyzed cryogel, pyrolyzed xerogel, pyrolyzed aerogel, etc. These may be used alone or in a combination thereof.

In some embodiments, the above-described carbon-based particles may have an amorphous structure or a crystalline structure. Preferably, the carbon-based particles may have the amorphous structure. In this case, durability of the anode active material may be increased to suppress generation of cracks that may be caused by the charging/discharging or an external impact. Accordingly, life-span properties of the secondary battery may be improved.

In exemplary embodiments, the anode active material may include silicon formed at the inside the pores of the above-described carbon-based particles or on the surfaces of the carbon-based particles. Thus, the difference in volume expansion ratios with carbon may be reduced while employing high-capacity properties of silicon. Accordingly, micro-cracks and the electrolyte exposure due to the repeated charging and discharging of the secondary battery may be prevented, thereby improving life-span properties while maintaining power properties of the secondary battery.

In exemplary embodiments, the above-described silicon may have an amorphous structure or a crystallite size of silicon measured by an X-ray diffraction (XRD) analysis may be 7 nm or less. In a preferable embodiment, the crystallite size may be 4 nm or less.

If the crystallite size is excessively large (e.g., greater than 7 nm), cracks may easily occur in the anode active material by, e.g., a pressing process for manufacturing the secondary battery or the repeated charging and discharging. Further, capacity retention may be degraded, and thus life-span properties of the secondary battery may also be degraded.

The term "amorphous structure" used herein refers to a case where a shape of a single silicon located at an inside a particle is amorphous or small within a range that a size measurement through Scherrer equation expressed by Equation 1 from the X-ray diffraction (XRD) analysis may not be substantially implemented.

In exemplary embodiments, "the crystallite size" is a value measured by the XRD analysis. The crystallite size may be obtained by calculating using Scherrer equation (as shown in Equation 1 below) that includes a full width at half maximum (FWHM) obtained through the XRD analysis.

$$L = \frac{0.9\lambda}{\beta \cos\theta} \qquad \text{[Equation 1]}$$

In the Equation 1 above, L is the crystallite size, λ is an X-ray wavelength, β is the FWHM of a corresponding peak, and θ is a diffraction angle. In exemplary embodiments, the FWHM in the XRD analysis for measuring the crystallite size may be measured from a peak of a (111) plane.

In some embodiments, in the Equation 1 above, β may be a FWHM correcting a value derived from a device. In an embodiment, Si may be used as a standard material for reflecting the device-derived value. In this case, a FWHM profile of Si over an entire 2θ range may be fitted, and the device-derived FWHM may be expressed as a function of 2θ. Thereafter, a value obtained by subtracting and correcting the FWHM value derived from the device in the corresponding 2θ obtained from the above function may be used as β.

In some embodiments, the above-mentioned silicon may include the amorphous structure. In this case, the crystallite size of silicon and a peak intensity ratio of a Raman spectrum, which will be described later, may be maintained within an appropriate range. Accordingly, enhanced life-span properties may be achieved while maintaining the capacity properties as described above.

In some embodiments, at least one of silicon oxide (SiOx, 0<x<2) and silicon carbide (SiC) may be further formed in the pores of the carbon-based particle or on the surface of the carbon-based particle.

In some embodiments, silicon carbide (SiC) may be not formed in the pores of the carbon-based particle or on the surface of the carbon-based particle. For example, only silicon or silicon oxide may be formed in the pores of the carbon-based particle or on the surface of the carbon-based particle. Accordingly, the capacity properties of the lithium secondary battery may be improved.

For example, forming of silicon carbide may be suppressed by controlling a temperature and time during silicon deposition process.

For example, the crystallite size of silicon included in silicon oxide may be 7 nm or less, preferably 4 nm or less.

In exemplary embodiments, the peak intensity ratio of the Raman spectrum of silicon defined as Equation 2 below may be 1.2 or less, preferably 1.0 or less.

Peak intensity ratio of Raman spectrum=$I(515)/I(480)$     [Equation 2]

In Equation 2, I(515) is a peak intensity of silicon at a wavenumber of 515 cm$^{-1}$ in the Raman spectrum, and I(480) is a peak intensity of silicon at a wavenumber of 480 cm$^{-1}$ in the Raman spectrum.

For example, I(515) in Equation 2 may represent a ratio of silicon having a crystalline structure, and I(480) in Equation 2 may represent a ratio of silicon having the amorphous structure.

For example, within the above-described peak intensity ratio, the ratio of the amorphous structure in silicon may be increased so that structural stability of the anode active material may be improved. Accordingly, enhanced life-span properties of the secondary battery may be obtained.

In some embodiments, the anode active material may have the above-described crystallite size range and the peak intensity ratio range of the Raman spectrum of silicon. In this case, the amorphous property of silicon may be further improved, and thus stability of the anode active material may be improved. Accordingly, an additional improvement in the life-span properties of the anode active material may be provided.

Hereinafter, a method of forming the anode active material for a lithium secondary battery according to exemplary embodiments is provided.

In exemplary embodiments, carbon-based particles including pores having a size of 20 nm or less may be prepared.

In some embodiments, an aromatic compound containing a hydroxyl group and an aldehyde-based compound may be mixed to prepare a resol oligomer. For example, the aromatic compound including the hydroxyl group may be phenol, and the aldehyde-based compound may be formaldehyde. The above-resol oligomer may be cured by adding a curing agent, and the carbon-based particles including pores of 20 nm or less may be obtained after performing a classification, a washing and a firing.

In some embodiments, an aromatic compound and a vinyl-based compound may be mixed and polymerized. Thereafter, washing and firing processes may be performed to obtain the carbon-based particles including pores of 20 nm or less. For example, the aromatic compound may be polystyrene, and the vinyl-based compound may be divinylbenzene.

In some embodiments, the formation of the carbon-based particles may further include an activation process. In this case, an activity of a pore structure of the carbon-based particles may be easily controlled.

For example, the activation process may include a physical activation method in which a gas having a reactivity with carbon (a steam, carbon dioxide, or a mixed gas of steam, carbon dioxide and an inert gas) may be introduced and heated at a temperature of 700° C. to 1000° C.

For example, the activation process may include a chemical activation method in which acidic or basic chemicals such as KOH, Na$_2$CO$_3$, NaOH, H$_3$PO$_4$, etc., may be used as an activator. The chemical activation method may be performed at a temperature lower than that in the physical activation method.

The pore size of the carbon-based particles obtained by the above-described method may be less than 10 nm.

In exemplary embodiments, a silicon-based compound gas may be introduced into a reactor in which the carbon-based particles are loaded and then fired to deposit silicon at an inside of the pores of the carbon-based particles or on surfaces of the carbon-based particles.

For example, the silicon-based compound gas may include a silane gas.

In some embodiments, the firing may be performed at a temperature less than 600° C. Within the temperature range, silicon may sufficiently include an amorphous structure and may be effectively deposited on the carbon-based particles. Accordingly, enhanced life-span properties may be obtained while satisfying the ranges of the Raman peak intensity ratio defined as Equation 2.

Figure 2:
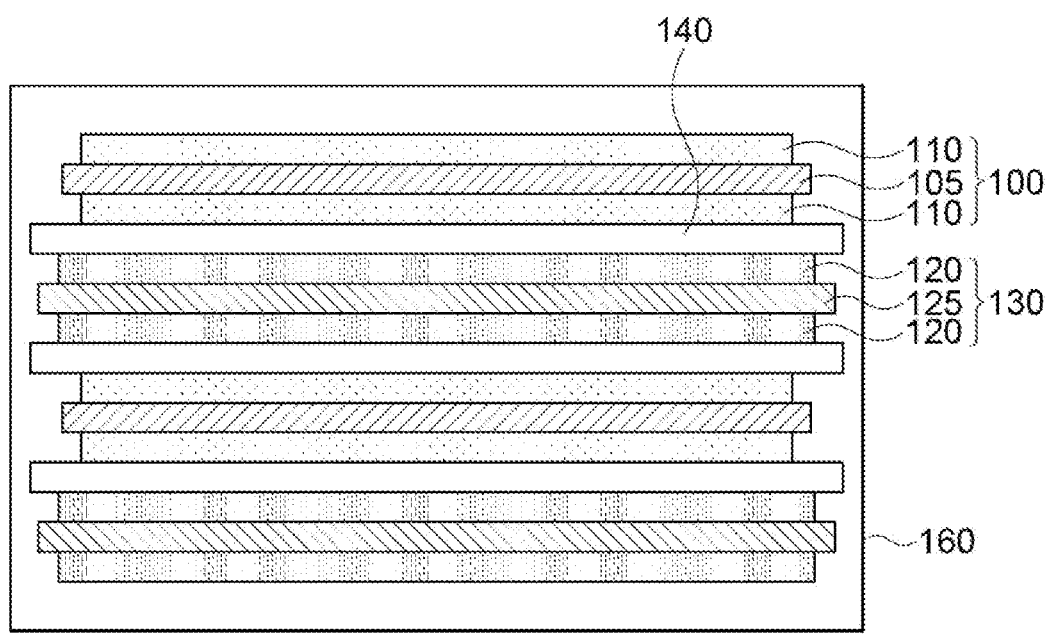

FIGS. 1 and 2 are a schematic top planar view and a schematic cross-sectional view, respectively, illustrating a lithium secondary battery in accordance with exemplary embodiments.

Hereinafter, a lithium secondary battery including an anode prepared from the anode active material for a lithium secondary battery as described above will be described with reference to FIGS. 1 and 2.

Referring to FIGS. 1 and 2, the lithium secondary battery may include an electrode assembly including a cathode 100, an anode 130 and a separation layer 140 interposed between the cathode and the anode. The electrode assembly may be accommodated in a case 160 together with the electrolyte to be impregnated therein.

The cathode 100 may include a cathode active material layer 110 formed by coating a mixture containing a cathode active material on a cathode current collector 105.

The cathode current collector 105 may include stainless-steel, nickel, aluminum, titanium, copper or an alloy thereof. Preferably, aluminum or an alloy thereof may be used. The cathode current collector 105 may be surface-treated using carbon, nickel, titan, silver, etc.

The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

$$Li_xNi_{1-y}M_yO_{2+z}$$ [Chemical Formula 1]

In Chemical Formula 1, $0.9 \leq x \leq 1.2$, $0 \leq y \leq 0.7$, and $-0.1 \leq z \leq 0.1$. M may be at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr.

In some embodiments, a molar ratio or a concentration (1−y) of Ni in Chemical Formula 1 may be 0.8 or more, preferably greater than 0.8.

A mixture may be prepared by mixing and stirring the cathode active material in a solvent with a binder, a conductive material and/or a dispersive agent. The mixture may be coated on the cathode current collector 105, and then dried and pressed to form the cathode 100.

The solvent may include a non-aqueous solvent. Non-limiting examples of the solvent may include N-methyl-2-pyrrolidone (NMP), dimethylformamide, dimethylacetamide, N,N-dimethylaminopropylamine, ethylene oxide, tetrahydrofuran, etc.

The binder commonly known in the related art may be used. For example, the binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, an anode active material slurry may be prepared from the above-described anode active material including the carbon-based particles and silicon. For example, the anode active material slurry may be prepared by mixing and stirring the anode active material in a solvent with an anode binder, a conductive material and a thickener.

For example, the anode binder may be a polymer material such as styrene-butadiene rubber (SBR). The thickener may include carboxymethyl cellulose (CMC).

For example, the conductive material substantially the same as or similar to that used in the formation of the cathode active material layer may also be used.

In some embodiments, the anode 130 may include an anode current collector 125 and an anode active material layer 120 formed by coating the anode active material slurry on at least one surface of the anode current collector 125, drying and pressing.

The anode current collector 125 may include a metal having high conductivity and improved adhesion to the anode active material slurry and not having a reactivity in a voltage range of the battery. For example, the anode current collector 125 may include stainless steel, nickel, copper, titanium, or an alloy thereof, preferably copper or a copper alloy may be used. The anode current collector 125 may be surface-treated with carbon, nickel, titanium, silver, or the like.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation. Thus, improvements of both capacity and life-span properties by employing the above-described anode active material may be more efficiently implemented.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with an electrolyte in the case 160 to define a lithium secondary battery. In exemplary embodiments, a non-aqueous electrolyte may be used as the electrolyte.

For example, the non-aqueous electrolyte solution may include a lithium salt and an organic solvent. The lithium salt commonly used in the electrolyte for the lithium secondary battery may be used, and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to be connected to an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Preparation of Carbon-Based Particle i) Synthesis of resol oligomer: Phenol and formaldehyde were mixed in a molar ratio of 1:2, and 1.5 wt % of triethylamine was added, followed by a reaction at 85° C. for 4 hours and at a stirring rate of 160 rpm.

ii) Suspension stabilization of resol oligomer: 1 g of PVA was dispersed in a water-dispersible medium, and then added to the above resol oligomer.

iii) Curing of the resol oligomer: 3 g of a curing agent HMTA was added, and a reaction was performed at 98° C. for 12 hours and at a stirring rate of 400 rpm.

iv) Obtaining carbon material: The cured resol oligomer was classified using a sieve, and then washed with $H_2O$.

v) Unreacted monomers and oligomers were removed from the washed resol oligomer using ethanol, and then dried.

vi) Carbonization and Activation: The dried resol oligomer was fired at 900° C. for 1 hour under a nitrogen atmosphere while $CO_2$ gas was introduced at a flow rate of 1 L/min to induce a carbonization at 900° C.

Deposition of Silicon

Silane gas was injected into a CVD coater at a flow rate of 50 to 100 mL/min, and maintained at a temperature less than 600° C. with a temperature raising rate of 5 to 20° C./min for about 120 to 240 minutes to deposit silicon on the carbon-based particles to prepare an anode active material.

Fabrication of Anode 95.5 wt % of a mixture of 15 wt % of the prepared anode active material and 80.5 wt % of artificial graphite, 1 wt % of CNT as a flake type conductive material, 2 wt % of styrene-butadiene rubber (SBR) as a binder and 1.5 wt % of carboxymethyl cellulose (CMC) as a thickener were mixed to obtain an anode active material slurry.

The anode active material slurry was coated on a copper substrate, dried and pressed to prepare an anode.

Fabrication of Li-Half Cell

A lithium secondary battery including the anode prepared as prepared above method and a lithium metal as a counter electrode (cathode) was prepared.

A lithium coin half-cell was constructed by interposing a separator (polyethylene, thickness 20 μm) between the anode and the lithium metal (thickness: 1 mm).

The assembly of the lithium metal/separator/anode was placed in a coin cell plate, an electrolyte was injected, and then a cap was covered and clamped. 1M LiPF6 solution in a mixed solvent of EC/FEC/EMC/DEC (20/10/20/50; volume ratio) was used as the electrolyte. After clamping and impregnating for more than 12 hours, 3 cycles of charging and discharging were performed at 0.1 C (charge condition CC-CV 0.1 C 0.01V 0.01 C CUT-OFF, discharge condition CC 0.1 C 1.5V CUT-OFF)

Example 2

Preparation of Carbon-Based Particle i) Polymerization inhibitors were removed from each of styrene (PS) and divinylbenzene (DVB).

ii) Thereafter, styrene and divinylbenzene were polymerized by performing an emulsion-free emulsion polymerization. Specifically, 360 mL of distilled water, 43.2 mL of ethanol, 40 mL of styrene and 4 mL of DVB were placed in a double jacketed reactor equipped with a reflux condenser and stirred at 300 rpm for 30 minutes at room temperature under a nitrogen atmosphere.

Subsequently, an aqueous solution of 0.37 g of potassium persulfate (KPS) dissolved in 50 mL of distilled water was added to the reactor and stirred at 70° C. for 24 hours at 300 rpm.

iii) Unreacted monomers and oligomers were removed from the stirred polymer using ethanol and dried.

vi) Carbonization and Activation: The dried polymer was fired at 900° C. for 1 hour under a nitrogen atmosphere while $CO_2$ gas was introduced at a flow rate of 1 L/min to induce a carbonization at 900° C.

An anode and a lithium-half cell were fabricated by the same method as that of Example 1 except for the method for preparing the carbon-based particles as described above.

Examples 3 and 4

An anode and a lithium-half cell were fabricated by the same method as that in Example 1, except that carbon-based particles having a pore size shown in Table 1 were prepared by controlling a temperature and a stirring time during the synthesis of the resol oligomer, and controlling a firing temperature in the carbonization and activation.

Example 5

An anode and a lithium-half cell were fabricated by the same method as that in Example 1, except for operations as follows:

i) In the preparation of the carbon-based particles, a temperature and a stirring time during the synthesis of the resol oligomer, and a firing temperature in the carbonization and activation were controlled to prepare carbon-based particles having a pore size shown in Table 1.

ii) A firing temperature was 600° C. in the silicon deposition.

Comparative Example 1

An anode and a lithium-half cell were fabricated by the same method as that in Example 1, except that carbon-based particles having a pore size shown in Table 1 were prepared by controlling a temperature and a stirring time during the synthesis of the resol oligomer, and controlling a firing temperature in the carbonization and activation.

Comparative Example 2

An anode and a lithium-half cell were fabricated by the same method as that in Example 1, except for operations as follows:

i) In the carbon-based particle preparation, carbon-based particles having a pore size shown in Table 1 were prepared by controlling a temperature and a stirring time during the synthesis of the resol oligomer and controlling a firing temperature in the carbonization and activation.

ii) In the silicon deposition, a silane gas was injected into a CVD coater at a flow rate of 100 to 500 mL/min while being maintained at 600° C. or higher for about 30 to 120 minutes at a temperature raising rate of 5 to 20° C./min to deposit silicon on the carbon-based particles.

Comparative Example 3

An anode and a lithium-half cell were fabricated by the same method as that in Example 1, except for operations for preparing the carbon-based particles.

Preparation of Carbon-Based Particles i) Silica ($SiO_2$) particles having an average particle diameter of 150 nm and a pitch formed from a petroleum/coal-based hydrocarbon residue were mixed in a weight ratio of 7:3 and mechanically stirred with high energy.

ii) The stirred mixture was fired at 900° C. under nitrogen atmosphere for 1 hour.

iii) The fired mixture was stirred in 3M NaOH solution for 6 hours to remove silica.

Comparative Example 4

An anode and a lithium-half cell were fabricated by the same method as that in Comparative Example 3, except that, in the deposition of silicon, a silane gas was injected into a CVD coater at a flow rate of 100 to 500 mL/min while being maintained at 600° C. or higher for about 30 to 120 minutes at a temperature raising rate of 5 to 20° C./min to deposit silicon on the carbon-based particles.

Comparative Example 5

An anode and a lithium-half cell were fabricated by the same method as that in Example 1, except that silicon was deposited by the same method as that in Comparative Example 4.

Experimental Example (1) Measurement of Pore Size of Carbon-Based Particles

The pore sizes of the carbon-based particles prepared according to the above-described Examples and Comparative Examples were measured using a surface area analyzer (ASAP-2420) manufactured by Micromeritics. Specifically, a maximum peak position of a Barrett-Joyner-Halenda (BJH) pore size distribution curve obtained from a nitrogen gas sorption isotherm curve was measured using samples from Examples and Comparative Examples to measure the pore size of the carbon-based particles.

(2) Measurement of Amorphous Property and Crystallite Size of Silicon

Crystallite sizes of the anode active materials prepared according to Examples and Comparative Examples were calculated using an XRD analysis and Equation 1 as described above.

If a silicon particle size was excessively small to be measured through the XRD analysis, the case was designated as amorphous.

Specific XRD analysis equipment/conditions are as shown in Table 1 below.

TABLE 1

| XRD(X-Ray Diffractometer) EMPYREAN | |
| --- | --- |
| Maker | PANalytical |
| Anode material | Cu |
| K-Alpha1 wavelength | 1.540598 Å |

TABLE 1-continued

| XRD(X-Ray Diffractometer) EMPYREAN | |
| --- | --- |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

(3) Measurement of Peak Intensity Ratio from Raman Spectrum

A Raman spectroscopy spectrum of silicon was measured using a 532 nm laser Raman spectrometer for the anode active material prepared according to the above-described Examples and Comparative Examples. In the obtained Raman spectrum, a silicon peak intensity in a region having a wavenumber of 515 $cm^{-1}$ and a silicon peak intensity in a region having a wavenumber of 480 $cm^{-1}$ were measured. The measured peak intensities were applied to the above-described Equation 2 to calculate a peak intensity ratio of the Raman spectrum.

The results are shown in Table 2 below.

TABLE 2

| No. | Pore Size (nm) | Crystallite Size (nm) | Peak Intensity Ratio |
| --- | --- | --- | --- |
| Example 1 | 9.5 | amorphous | 0.581 |
| Example 2 | 6 | 4 | 0.897 |
| Example 3 | 11 | amorphous | 0.903 |
| Example 4 | 19 | amorphous | 0.771 |
| Example 5 | 9 | 5 | 1.053 |
| Comparative Example 1 | 20.5 | 6 | 1.081 |
| Comparative Example 2 | 13 | 7.5 | 1.230 |
| Comparative Example 3 | 150 | amorphous | 0.95 |
| Comparative Example 4 | 200 | 25 | 1.21 |
| Comparative Example 5 | 25 | 8 | 1.37 |

(4) Measurement of Volume Expansion Ratio Relative to Capacity of Anode Active Material The lithium secondary batteries of Examples and Comparative Examples were charged (CC/CV 0.1 C 0.01V 0.01 C CUT-OFF). An increasing ratio of an anode volume after charging relative to an initial anode volume was calculated as a percentage, and then divided by a charging capacity to evaluate a volume expansion ratio.

(5) Measurement of Capacity Retention (Life-Span Property) During Repeated Charging and Discharging The lithium secondary batteries of Examples and Comparative Examples were charged (CC/CV 0.5 C 0.01V 0.01 C CUT-OFF) and discharged (CC 0.1 C 3.0V CUT-OFF) 50 times. A capacity retention was evaluated as a percentage of a capacity at the 500th cycle relative to a capacity at the 1st cycle.

The results are shown in Table 3 below.

TABLE 3

| No. | Volume expanstion ratio (%)/ charging capacity (mAh/g) | Capacity Retention (%) |
| --- | --- | --- |
| Example 1 | 3.25 | 98 |
| Example 2 | 2.5 | 95 |
| Example 3 | 3.6 | 90 |

TABLE 3-continued

| No. | Volume expanstion ratio (%)/ charging capacity (mAh/g) | Capacity Retention (%) |
|---|---|---|
| Example 4 | 3.8 | 90 |
| Example 5 | 3.5 | 87 |
| Comparative Example 1 | 5.8 | 83 |
| Comparative Example 2 | 4.6 | 81 |
| Comparative Example 3 | 7.7 | 80 |
| Comparative Example 4 | 8.1 | 63 |
| Comparative Example 5 | 6.9 | 75 |

Referring to Table 3, Examples where silicon was deposited on the carbon-based particles having the pore size of 20 nm or less to have the amorphous structure or the crystallite size of 7 nm or less generally provided lower volume expansion rations and higher capacity retentions than those of Comparative Examples.

In a relative aspect when comparing Examples 1 to 4 with Example 5, Examples 1 to 4 provided higher capacity retentions than that from the case having the crystallite size exceeded 4 nm (e.g., Example 5).

In a relative aspect when comparing Examples 1 and 2 with Examples 3 and 4, Examples 1 and 2 provided performance greater than that when the pore size exceeded 10 nm (e.g., Examples 3 and 4).

In another aspect, Examples where silicon was deposited on the carbon-based particles having the pore size of 20 nm or less so that the Raman spectrum peak intensity ratio of silicon was 1.2 or less generally provided lower volume expansion rations and higher capacity retentions than those of Comparative Examples.

In a relative aspect when comparing Examples 1 to 4 with Example 5, Examples 1 to 4 provided higher capacity retentions than that from the case having the peak intensity ratio of the Raman spectrum exceeded 1.0 (e.g., Example 5).

What is claimed is:

1. An anode active material for a lithium secondary battery, comprising:
    an amorphous carbon-based particle comprising pores formed in at least one of an inside of the particle and a surface of the particle, wherein a pore size of the carbon-based particle is 20 nm or less; and
    silicon formed from a silicon-based compound gas at an inside of the pores of the carbon-based particle or on the surface of the carbon-based particle,
    wherein the silicon has an amorphous structure or has a crystallite size measured by an X-ray diffraction (XRD) analysis which is 7 nm or less.

2. The anode active material for a lithium secondary battery of claim 1, wherein the crystallite size of silicon is measured by Equation 1:

$$L = \frac{0.9\lambda}{\beta \cos\theta} \quad \text{[Equation 1]}$$

wherein, in Equation 1, L is the crystallite size (nm), λ is an X-ray wavelength (nm), β is a full width at half maximum (rad) from a peak of a (111) plane of silicon, and θ is a diffraction angle (rad).

3. The anode active material for a lithium secondary battery of claim 1, wherein the pore size of the carbon-based particle is less than 10 nm.

4. The anode active material for a lithium secondary battery of claim 1, further comprising at least one of silicon oxide (SiOx, 0<x<2) and silicon carbide (SiC) formed at the inside of the pores of the carbon-based particle or on the surface of the carbon-based particle.

5. The anode active material for a lithium secondary battery of claim 4, wherein a crystallite size of silicon included in silicon oxide is 7 nm or less.

6. The anode active material for a lithium secondary battery of claim 1, wherein the silicon formed from the silicon-based compound gas is crystalline and has the crystallite size of 7 nm or less.

7. A lithium secondary battery, comprising:
    an anode comprising an anode active material for a lithium secondary battery according to claim 1; and
    a cathode facing the anode.

8. A method of forming an anode active material for a lithium secondary battery, comprising:
    preparing an amorphous carbon-based particle including pores that have a pore size of 20 nm or less;
    injecting a silicon-based compound gas to the carbon-based particle; and
    firing the carbon-based particle together with the silicon-based compound gas to deposit silicon at an inside of the pores of the carbon-based particle or on the surface of the carbon-based particle,
    wherein silicon has an amorphous structure or a crystallite size of silicon measured by an X-ray diffraction (XRD) analysis is 7 nm or less.

9. The method of claim 8, wherein the firing is performed at a temperature less than 600° C.

10. The anode active material for a lithium secondary battery of claim 6, wherein the crystallite size of the silicon formed from the silicon-based compound gas is 4 nm or less.

* * * * *